(12) United States Patent
Rui

(10) Patent No.: US 12,387,401 B2
(45) Date of Patent: Aug. 12, 2025

(54) IMAGE PROCESSING METHOD AND ELECTRONIC DEVICE

(71) Applicant: VIVO MOBILE COMMUNICATION CO., LTD., Dongguan (CN)

(72) Inventor: Yuanle Rui, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 409 days.

(21) Appl. No.: 17/952,416

(22) Filed: Sep. 26, 2022

(65) Prior Publication Data

US 2023/0018905 A1    Jan. 19, 2023

Related U.S. Application Data

(63) Continuation of application No. PCT/CN2021/081983, filed on Mar. 22, 2021.

(30) Foreign Application Priority Data

Mar. 27, 2020  (CN) .......................... 202010229382.0

(51) Int. Cl.
*G06T 11/60* (2006.01)
*G06V 30/19* (2022.01)
*G06V 30/414* (2022.01)

(52) U.S. Cl.
CPC .......... *G06T 11/60* (2013.01); *G06V 30/1908* (2022.01); *G06V 30/19147* (2022.01); *G06V 30/414* (2022.01)

(58) Field of Classification Search
CPC ................ G06T 11/60; G06V 30/1908; G06V 30/19147; G06V 30/414
See application file for complete search history.

(56) References Cited

U.S. PATENT DOCUMENTS

2012/0033874 A1    2/2012   Perronnin et al.
2019/0243875 A1    8/2019   Jain et al.

FOREIGN PATENT DOCUMENTS

| CN | 104715497 A | 6/2015 |
|---|---|---|
| CN | 108241594 A | 7/2018 |
| CN | 108829326 A | 11/2018 |

(Continued)

OTHER PUBLICATIONS

Wu, Editing Text in the Wild, arXiv:1908.03047v1 [cs.CV] Aug. 8, 2019 (Year: 2019).*

(Continued)

*Primary Examiner* — Vu Le
*Assistant Examiner* — Lei Zhao
(74) *Attorney, Agent, or Firm* — IPX PLLC

(57) ABSTRACT

An image processing method and an electronic device are provided. The image processing method includes: receiving a first input performed by a user; identifying a first text region on a target image in response to the first input; training a text image of the first text region on the target image to obtain a first font style model of the first text region; receiving a second input performed by the user; in response to the second input, obtaining a first input text, and training the first input text according to the first font style model to obtain a second text matching a font style of the first text region; and replacing text of the first text region with the second text on the target image.

15 Claims, 3 Drawing Sheets

(56) References Cited

FOREIGN PATENT DOCUMENTS

| CN | 109189985 A | 1/2019 |
|---|---|---|
| CN | 109285111 A | 1/2019 |
| CN | 110008884 A | 7/2019 |
| CN | 110458918 A | 11/2019 |
| CN | 110738026 A | 1/2020 |
| CN | 111402367 A | 7/2020 |

OTHER PUBLICATIONS

Microsoft Community, How to change a selected font from whole document, https://answers.microsoft.com/en-us/msoffice/forum/all/how-to-change-a-selected-font-from-whole-document/b3b47e54-c9e5-4e5c-be72-961ba3eda512, 2018 (Year: 2018).*

Extended European Search Report issued in related European Application No. 21776192.3, mailed Sep. 12, 2023, 6 pages.

Wu Liang et al, "Editing Text in the Wild", Procedings of the 28th ACM Joint Meeting on European Sofware Engineering Conference and Symposium on the Foundations of Software Engineering, Oct. 15, 2019, 9 pages.

Prasun Roy et al: "STEFANN: Scene Text Editor using Font Adaptive Neural Network", arxiv. org, Cornell University Library, 201 Olin Library Cornell University Ithaca, NY 14853, Mar. 4, 2019, 13 pages.

Office Action issued in related Korean Application No. 10-2022-7035671, mailed May 21, 2024, 5 pages.

Qiangpeng Yang, et al., "SwapText: Image Based Texts Transfer in Scenes", CVPR 2020, arXiv:2003.08152v1 [cs.CV] Mar. 18, 2020, 10 pages.

First Office Action issued in related Chinese Application No. 202010229382.0, mailed Mar. 11, 2023, 7 pages.

International Search Report issued in corresponding International Application No. PCT/CN2021/081983, mailed Jul. 1, 2021, 4 pages.

Examination report issued in related Indian Application No. 202217049908, mailed May 14, 2025, 8 pages.

Aksan et al., "DeepWriting: Making Digital Ink Editable via Deep Generative Modeling", 14 pages.

Kuo et al., "HuayuNavi: A Mobile Chinese Learning Application Based on Intelligent Character Recognition" Dec. 11, 2011, 9 pages.

Office Action issued in related European Application No. 21776192.3, mailed Apr. 9, 2025, 4 pages.

* cited by examiner

IMAGE PROCESSING METHOD AND ELECTRONIC DEVICE

CROSS-REFERENCE TO RELATED APPLICATIONS

This application is a continuation of International Application No. PCT/CN2021/081983, filed on Mar. 22, 2021, which claims priority to Chinese Patent Application No. 202010229382.0, filed on Mar. 27, 2020. The entire contents of each of the above-identified applications are expressly incorporated herein by reference.

TECHNICAL FIELD

The present disclosure relates to the field of communication technologies, and in particular, to an image processing method and an electronic device.

BACKGROUND

Currently, in order to perform picture text replacement editing by an electronic device, it is necessary to remove original text by performing a smearing operation, then add a text input box on the picture, set the color and font of the added text, and then paste the inputted text into the original picture.

Although the current text editing method can realize text replacement, on the one hand, the user needs to manually smear and adjust the original text region on the picture, and in this process, it is difficult to control a smearing range in a refined manner, the complexity of the operation is high, and it is difficult to smear accurately; and on the other hand, only the default set font and color can be selected for the replacement text, and consequently, display effect inconsistency between the replacement text and the original text is prone to occur, making the text editing relatively rigid and causing a poor text editing effect.

SUMMARY

The present disclosure provides an image processing method and an electronic device.

According to a first aspect, an embodiment of the present disclosure provides an image processing method, performed by an electronic device, the method including:
receiving a first input performed by a user;
identifying a first text region on a target image in response to the first input;
training a text image of a first text of the first text region on the target image to obtain a first font style model of the first text;
receiving a second input performed by the user;
in response to the second input, obtaining a first input text, and training the first input text according to the first font style model to obtain a second text matching a font style of the first text;
and replacing the first text with the second text on the target image.

According to a second aspect, an embodiment of the present disclosure provides an electronic device, including:
a first receiving module, configured to receive a first input performed by a user;
an identification module, configured to identify a first text region on a target image in response to the first input;
a first processing module, configured to train a text image of a first text of the first text region on the target image to obtain a first font style model of the first text;
a second receiving module, configured to receive a second input performed by the user;
a second processing module, configured to, in response to the second input, obtain a first input text, and train the first input text according to the first font style model to obtain a second text matching a font style of the first text; and
a first replacement module, configured to replace the first text with the second text on the target image.

According to a third aspect, an embodiment of the present disclosure provides an electronic device, including a processor, a memory, and a computer program stored on the memory and executable by the processor, the computer program implementing steps of the image processing method when executed by the processor.

According to a fourth aspect, an embodiment of the present disclosure provides a computer-readable storage medium, where the computer-readable storage medium stores a computer program, the computer program implementing steps of the image processing method when executed by the processor.

BRIEF DESCRIPTION OF THE DRAWINGS

The following describes the accompanying drawings for describing the embodiments of the present disclosure. Apparently, the accompanying drawings described below show merely some embodiments of the present disclosure, and a person of ordinary skill in the art may still derive other drawings from these accompanying drawings without creative efforts.

DETAILED DESCRIPTION

Figure 1:
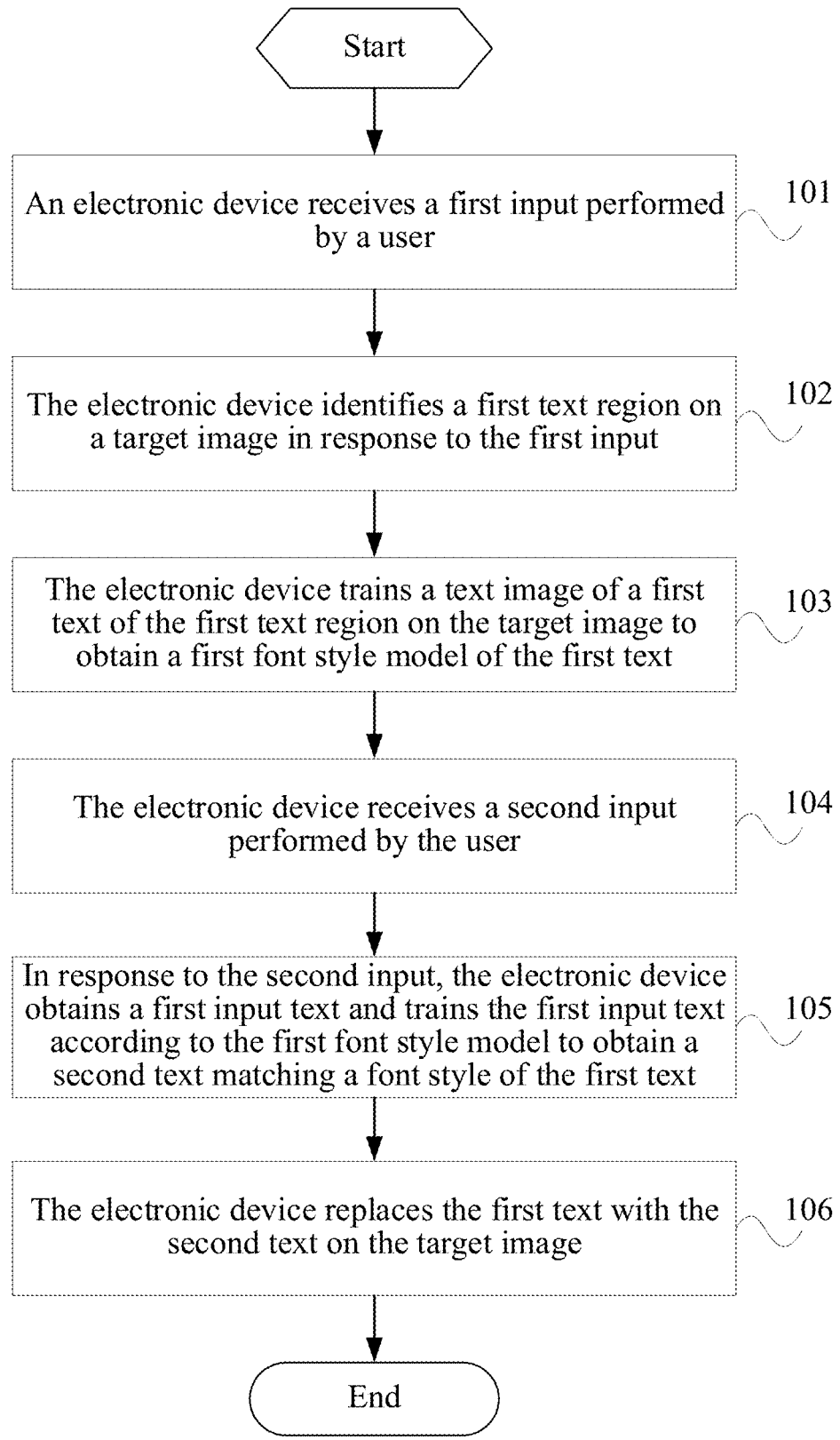
FIG. 1 shows a schematic flowchart of an image processing method according to an embodiment of the present disclosure.

Referring to FIG. 1, FIG. 1 shows a schematic flowchart of an image processing method according to an embodiment of the present disclosure. An embodiment of the present disclosure provides an image processing method, applied to an electronic device having a screen display function, and the image processing method in this embodiment of the present disclosure may include the following steps.

Step 101: An electronic device receives a first input performed by a user.

In this embodiment of the present disclosure, in a case that the electronic device displays a target image, the user may perform a first input operation to cause the electronic device to receive the first input, thereby triggering the electronic device to perform an identification operation on a first text of the target image.

The first input may include at least one of a voice input, a body action input, a touch input acting on the electronic device, or a motion input acting on the electronic device. The body action input may include, but is not limited to, at least one of a gesture action input, a head action input, a face action input, or the like, the touch input acting on the electronic device may include, but is not limited to, a touch input acting on a screen or a housing, and the motion input acting on the electronic device may include, but is not limited to, at least one of a swing action input and a flip action input acting on the electronic device, a curved input/bend input acting on a flexible screen, or the like.

Step 102: The electronic device identifies a first text region on a target image in response to the first input.

In this embodiment of the present disclosure, in response to the first input received in step 101, the electronic device detects the target image, and identifies the first text region displayed on the target image. In some embodiments, the electronic device can detect the target image by using the Optical Character Recognition (OCR) technology and Artificial Intelligence (AI) technology to identify the first text region on the target image and obtain the first text and a coordinate position of the first text on the target image.

In some embodiments, in order to facilitate the user to intuitively determine an identification result, the electronic device can detect the content of the first text of the first text region on the target image and the coordinate position of the first text on the target image, and then mark and display the first text region on the target image by a predetermined marker. Exemplarily, the first text region on the target image can be marked and displayed by an image mask, for example, the first text region can be displayed by the image mask to a predetermined color (such as red) for the user to view and confirm. When the electronic device receives a movement input marked by the predetermined marker by the user, the electronic device performs text identification on an end position of the movement input in response to the movement input, to identify and determine the first text, thereby facilitating the user to correct a misidentified position in time, where the movement input may include at least one of a drag input or a press-drag input.

Step 103: The electronic device trains a text image of a first text of the first text region on the target image to obtain a first font style model of the first text.

In this embodiment of the present disclosure, the electronic device inputs the text image of the first text identified in step 102 into a training model for AI training, thereby obtaining the first font style model corresponding to the first text, so that in a subsequent step, the font style can be kept unchanged in a process of performing text editing on the target image based on the first font style model, which enables the edited text to be seamlessly integrated with the target image.

Step 104: The electronic device receives a second input performed by the user.

In this embodiment of the present disclosure, the user can trigger an editing modification to the first text by performing a second input operation. The second input may include at least one of a voice input, a body action input, a touch input acting on the electronic device, or a motion input acting on the electronic device.

In some embodiments, in order to facilitate intuitive and quick operation by the user, the second input may be a preset touch input performed on the first text of the target image, and for example, the preset touch input may be at least one of a click input or a press input.

Step 105: In response to the second input, the electronic device obtains a first input text and trains the first input text according to the first font style model to obtain a second text matching a font style of the first text.

In this embodiment of the present disclosure, in response to the second input received in step 104, the electronic device obtains the first input text inputted by the user, and then inputs the first input text into the first font style model of the first text for training, thereby obtaining text matching the font style of the first text, that is, the second text, so that a font style of the text inputted by the user and a font style of the original text (the first text) on the target image can remain unchanged, which enables the edited text (that is, the second text) to be seamlessly integrated with the target image.

Step 106. The electronic device replaces the first text with the second text on the target image.

In this embodiment of the present disclosure, the electronic device replaces the first text on the target image with the second text obtained by training in step 105, to conveniently perform the text replacement on the target image and enable the font style of the text inputted by the user and the font style of the original text on the target image to remain unchanged, so that the text inputted by the user can be seamlessly integrated with the target image.

In some embodiments, after replacing the first text with the second text, the electronic device can integrate the second text with the target image for storage, thereby obtaining an image desired by the user.

In the embodiments of the present disclosure, the electronic device receives a first input performed by a user, identifies a first text region on a target image in response to the first input, trains a text image of a first text of the first text region on the target image to obtain a first font style model, receives a second input, then trains, in response to the second input, an obtained first input text according to the first font style model to obtain a second text matching a font style of the first text, and replaces the first text with the second text on the target image. Therefore, text replacement performed on the target image can be conveniently performed, a font style of text inputted by the user and a font style of original text on the target image are kept unchanged, and the text inputted by the user is seamlessly integrated with the target image, thereby resolving the problem of complicated and rigid text replacement editing performed on the image.

In some embodiments, in some embodiments of the present disclosure, step 103, in which the electronic device trains a text image of a first text of the first text region on the target image to obtain a first font style model of the first text, may include the following steps: identifying, by the electronic device, a language category to which the first text belongs; and training, by the electronic device, the text image of the first text on the target image in a corpus corresponding to the language category to obtain the first font style model. In this way, the electronic device inputs the text image of the first text into a training model of the corpus corresponding to the language category to which the first text belongs for training, so that the font style model corresponding to the first text can be obtained based on quick and accurate training performed on corpus data of the corresponding corpus.

In some embodiments, in some embodiments of the present disclosure, after step 106 in which the electronic device replaces the first text with the second text on the target image, the image processing method may further include: performing, by the electronic device, perspective transformation on the second text on the target image according to a mapping relationship between a layer on which the text image of the first text is located and a background layer in the target image. In this way, a placement setting position of the replaced second text on the target image can be consistent with a placement setting position of the original first text, which ensures that display effects of the text before and after editing are consistent.

In some embodiments, in some embodiments of the present disclosure, after replacing the first text with the second text on the target image, the electronic device can further repair a text background region to restore an original background style effect. For example, after step 106 in which the electronic device replaces the first text with the second text on the target image, the image processing method may further include: generating, by the electronic device, a background image in a region corresponding to the second text on the target image according to a background style corresponding to the text image of the first text. In this way, new text (that is, the second text) can be seamlessly integrated with a background of the target image.

For example, in some embodiments of the present disclosure, the generating, by the electronic device, a background image in a region corresponding to the second text on the target image according to a background style corresponding to the text image of the first text may include one of the following.

Method 1: The electronic device fills the region corresponding to the second text with pixels on the target image according to pixel information of a region corresponding to the text image of the first text, to generate the background image. In the method 1, the background image of the region corresponding to the second text is generated by using the pixel information of the region corresponding to the text image of the first text as a background filling basis, so that the background style of the region corresponding to the second text can be made consistent with the original background style of the first text.

Method 2: The electronic device generates the background image in the region corresponding to the second text by using a generative adversarial networks model according to the pixel information of the region corresponding to the text image of the first text. In the method 2, a generative model and a discriminative model of the Generative Adversarial Networks (GANs) model are used to learn the pixel information of the region corresponding to the text image of the first text by gaming with each other, so as to generate the background image of the region corresponding to the second text, so that the background style of the region corresponding to the second text can be made more consistent with the original background style of the first text region.

In this embodiment of the present disclosure, after step 106 in which the electronic device replaces the first text with the second text on the target image, the electronic device can also generate the background image through the pixel information around the region where the second text is located.

In some embodiments, in some embodiments of the present disclosure, a translation function can be further provided in a process of modifying and editing the text. The electronic device can translate the text inputted by the user into a preset language type and then input it into the first font style model for training. That is, in the embodiments of the present disclosure, the first input text may be text inputted by the second input, or may be translation text of the text inputted by the second input translated into the preset language type. In this way, the diversified editing needs of the user can be met.

In some embodiments, in some embodiments of the present disclosure, in order to further realize the diversified editing of text in the target image, after step 102 in which the electronic device identifies a first text region on a target image in response to the first input, the image processing method may further include the following steps: displaying, by the electronic device, preset stored font styles to be selected; receiving, by the electronic device, a third input of a target font style in the font styles to be selected by the user; training, by the electronic device in response to the third input, the first text according to a second font style model corresponding to the target font style to obtain a third text matching the target font style; and replacing, by the electronic device, the first text with the third text on the target image. This makes it easy for the user to apply their preferred font styles to modify and edit the text of the target image. The font style to be selected may be a font style pre-stored or pre-collected by the electronic device, or may be a font style used in a predetermined time period on the electronic device. In addition, the electronic device stores a font style model corresponding to the font style to be selected, for example, the predetermined time period may be within a week before the current system time, and the font style to be selected may be a font style used within a week (that is, used recently). In addition, in order to avoid occupying excessive cache resources of the electronic device, in a case that the font style to be selected is a font style used in a predetermined time period on the electronic device, the number of the font styles to be selected may be predetermined, and the predetermined number may be set by default by the electronic device, or may be set by the user, for example, the predetermined number may be three.

For example, in some embodiments of the present disclosure, in order to facilitate the user to quickly perform an editing operation on the first text, after step 103 in which the electronic device trains a text image of a first text on the target image to obtain a first font style model of the first text, the image processing method may further include: displaying the first text in a text box on the target image. In this way, the user can implement quick text editing based on the first text displayed in a form of the text box. In some embodiments, the electronic device may mark the first text region with a quadrilateral on the target image and then perform perspective transformation on the quadrilateral marker to display the first text in the text box.

Exemplarily, step 104, in which the electronic device receives a second input performed by the user, may include: receiving the second input performed on the text box, where the second input may be a preset touch input, for example, may be at least one of a click input performed on the text box or a press input performed on the text box. Further, in order to facilitate the user to quickly edit and input, in step 105, before the first input text is obtained and the first input text is trained according to the first font style model to obtain the second text matching the font style of the first text, the electronic device displays a text input interface in response to the second input, and the electronic device extracts text content of the first text and displays the text content of the first text on the text input interface, so that the user can quickly perform editing and modification again on the text content of the first text through the text input interface. The text input interface may be an input keyboard.

Exemplarily, after the electronic device displays the first text in the text box on the target image, the electronic device may receive a preset input performed on the text box by the user, and adjust at least one of the display size or display position of the first text on the target image in response to the preset input, for example, the user can zoom in, rotate, and move the first text through the preset input performed the text box.

Exemplarily, in order to improve the human-machine experience of the user and facilitate the user to operate simply, in this embodiment of the present disclosure, a preset control may be configured, and before the electronic device operates the corresponding adjustment input (such as the first input, the second input, or the third input), a touch input performed on the preset control by the user may be received, so as to trigger the adjustment input to enable a text replacement function, a translation function, and a function of adjusting the display size and the display position in the editing operation performed on the first text, thereby avoiding mistaken operations of the user.

In the image processing method according to the embodiments of the present disclosure, a first input performed by a user is received; a first text region on a target image is identified in response to the first input; a text image of a first text of the first text region on the target image is trained to obtain a first font style model; a second input is received; then in response to the second input, an obtained first input text is trained according to the first font style model, to obtain a second text matching a font style of the first text; and the first text is replaced with the second text on the target image. Therefore, text replacement performed on the target image can be conveniently implemented, a font style of text inputted by the user and a font style of original text on the target image are kept unchanged, and the text inputted by the user is seamlessly integrated with the target image, thereby resolving the problem of complicated and rigid text replacement editing performed on the image.

Based on the above method, an embodiment of the present disclosure provides an electronic device configured to implement the above method.

Figure 2:
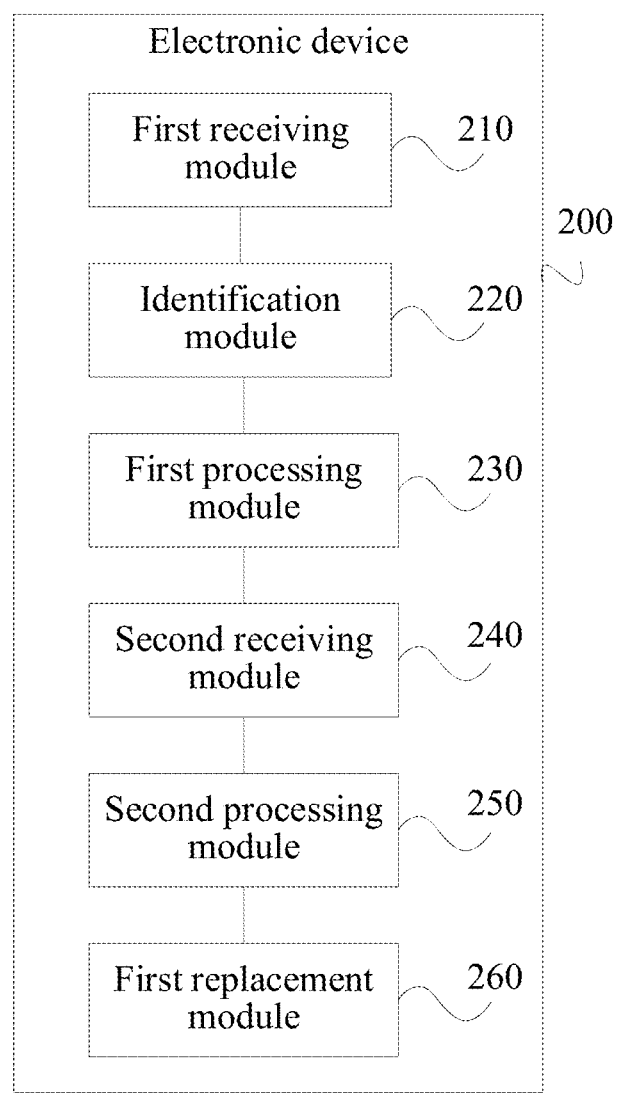
FIG. 2 shows a schematic structural diagram of an electronic device according to an embodiment of the present disclosure.

Referring to FIG. 2, FIG. 2 shows a schematic structural diagram of an electronic device according to an embodiment of the present disclosure. An embodiment of the present disclosure provides an electronic device 200, and the electronic device 200 may include: a first receiving module 210, an identification module 220, a first processing module 230, a second receiving module 240, a second processing module 250, and a first replacement module 260.

The first receiving module 210 is configured to receive the first input performed by a user;

the identification module 220 is configured to identify a first text region on a target image in response to the first input;

the first processing module 230 is configured to train a text image of a first text of the first text region on the target image to obtain a first font style model of the first text;

the second receiving module 240 is configured to receive a second input performed by the user;

the second processing module 250 is configured to, in response to the second input, obtain a first input text, and train the first input text according to the first font style model to obtain a second text matching a font style of the first text; and the first replacement module 260 is configured to replace the first text with the second text on the target image.

In some embodiments, in some embodiments of the present disclosure, the first processing module 230 may include: an identification unit and a first processing unit.

The identification unit is configured to identify a language category to which the first text belongs; and the first processing unit is configured to train the text image of the first text on the target image in a corpus corresponding to the language category to obtain the first font style model.

In some embodiments, in some embodiments of the present disclosure, the electronic device 200 may further include: a third processing module.

The third processing module is configured to perform perspective transformation on the second text on the target image according to a mapping relationship between a layer on which the text image of the first text is located and a background layer in the target image.

In some embodiments, in some embodiments of the present disclosure, the electronic device 200 may further include: a fourth processing module.

The fourth processing module is configured to generate a background image in a region corresponding to the second text on the target image according to a background style corresponding to the text image of the first text.

For example, in some embodiments of the present disclosure, the fourth processing module may include one of the following: a second processing unit or a third processing unit.

The second processing unit is configured to fill the region corresponding to the second text with pixels on the target image according to pixel information of a region corresponding to the text image of the first text, to generate the background image; or the third processing unit is configured to generate the background image in the region corresponding to the second text by using a generative adversarial networks model according to the pixel information of the region corresponding to the text image of the first text.

For example, in some embodiments of the present disclosure, the first input text is the text inputted by the second input, or the translation text of the text inputted by the second input translated into the preset language type.

For example, in some embodiments of the present disclosure, the electronic device 200 may further include: a display module, a third receiving module, a fourth processing module, and a second replacement module.

The display module is configured to display preset stored font styles to be selected;

the third receiving module is configured to receive a third input of a target font style in the font styles to be selected by the user;

the fourth processing module is configured to, train, in response to the third input, the first text according to a second font style model corresponding to the target font style to obtain a third text matching the target font style; and the second replacement module is configured to replace the first text with the third text on the target image.

The electronic device 200 according to this embodiment of the present disclosure can implement various processes implemented by the electronic device in the method embodiment in FIG. 1, and the description is not repeated here in order to avoid repetition.

By using the electronic device according to the embodiments of the present disclosure, under cooperation of the first receiving module, the identification module, and the first processing module, a first input performed by a user is received; a first text region on a target image is identified in response to the first input, a text image of a first text of the first text region on the target image is trained to obtain a first font style model; and then under cooperation of the second receiving module, the second processing module, and the first replacement module, a second input is received; in response to the second input, an obtained first input text is trained according to the first font style model, to obtain a second text matching a font style of the first text; and the first text is replaced with the second text on the target image. Therefore, text replacement performed on the target image can be conveniently implemented, a font style of text inputted by the user and a font style of original text on the target image are kept unchanged, and the text inputted by the user is seamlessly integrated with the target image, thereby resolving the problem of complicated and rigid text replacement editing performed on the image.

Figure 3:
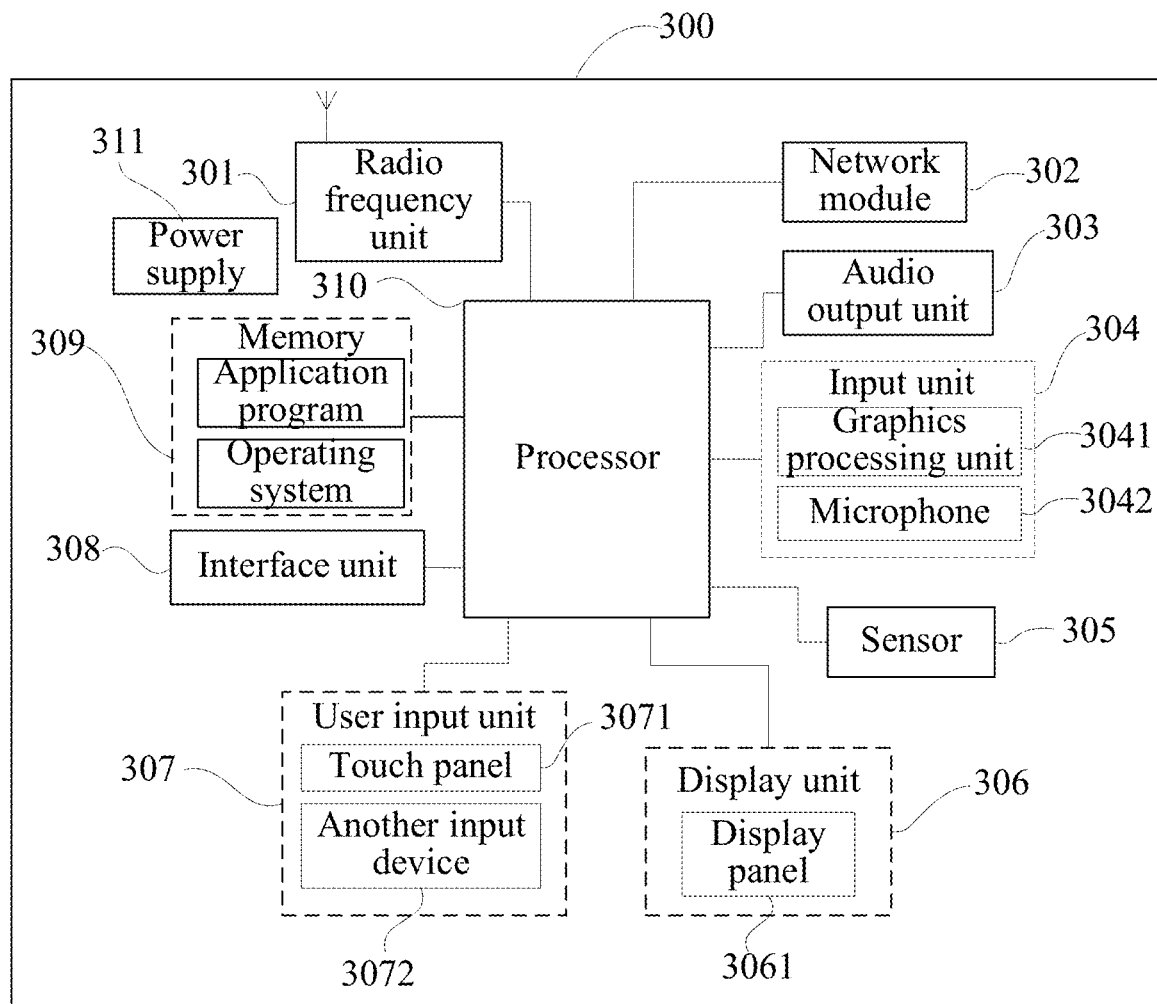
FIG. 3 shows a schematic structural diagram of hardware of an electronic device according to an embodiment of the present disclosure.

FIG. 3 is a schematic structural diagram of hardware of an electronic device implementing various embodiments of the present disclosure.

This electronic device 300 includes, but is not limited to, components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the electronic device structure shown in FIG. 3 does not constitute a limitation to the electronic device. The electronic device may include more or fewer components than those shown in the figure, or may combine some components, or may have different component arrangements. In this embodiment of the present disclosure, the electronic device includes, but is not limited to, a mobile phone, a tablet computer, a laptop computer, a handheld computer, an in-vehicle terminal, a wearable device, a pedometer, and the like.

The user input unit 307 is configured to receive a first input performed by a user; the processor 310 is configured to identify a first text region on a target image in response to the first input; and train a text image of a first text of the first text region on the target image to obtain a first font style model of the first text. The user input unit 307 is further configured to receive a second input performed by the user; the processor 310 is further configured to, in response to the second input, obtain the first input text, and train the first input text according to the first font style model to obtain a second text matching a font style of the first text; and the display unit 306 is configured to replace the first text with the second text on the target image. In this way, the text replacement performed on the target image can be conveniently implemented, the font style of the text inputted by the user and the font style of the original text on the target image are kept unchanged, and the text inputted by the user is seamlessly integrated with the target image, thereby resolving the problem of complicated and rigid text replacement editing performed on the image.

It should be understood that in this embodiment of the present disclosure, the radio frequency unit 301 may be configured to send and receive signals in in an information receiving and sending process or a call process. In some embodiments, the radio frequency unit 301 is configured to receive downlink data from a base station, and then transmit the downlink data to the processor 310 for processing; and additionally, send uplink data to the base station. Generally, the radio frequency unit 301 includes, but is not limited to, an antenna, at least one amplifier, a transceiver, a coupler, a low noise amplifier, a duplexer, or the like. In addition, the radio frequency unit 301 may further communicate with another device through a wireless communication system and a network.

The electronic device provides wireless broadband Internet access to the user through the network module 302, for example, helps the user to send and receive emails, browse web pages, and access stream media.

The audio output unit 303 may convert audio data received by the radio frequency unit 301 or the network module 302 or audio data stored in the memory 309 into audio signals and output the audio signals as sounds. Moreover, the audio output unit 303 may further provide an audio output related to a specific function executed by the electronic device 300 (for example, a call signal reception sound, and a message reception sound). The audio output unit 303 includes a speaker, a buzzer, a receiver, and the like.

The input unit 304 is configured to receive audio or video signals. The input unit 304 may include a Graphics Processing Unit (GPU) 3041 and a microphone 3042. The graphics processing unit 3041 processes image data of static pictures or videos obtained by an image capture device (for example, a camera) in a video capture mode or an image capture mode. The processed image frames may be displayed on the display unit 306. The image frames processed by the graphics processing unit 3041 may be stored in the memory 309 (or another storage medium) or sent via the radio frequency unit 301 or the network module 302. The microphone 3042 may receive sounds and can process such sounds as audio data. The processed audio data may be converted, in a phone talk mode, into a format that may be sent to a mobile communication base station via the radio frequency unit 301 for output.

The electronic device 300 further includes at least one sensor 305, such as an optical sensor, a motion sensor, or other sensors. In some embodiments, the optical sensor includes an ambient light sensor and a proximity sensor. The ambient light sensor may adjust luminance of a display panel 3061 according to brightness of the ambient light. The proximity sensor may switch off the display panel 3061 and/or backlight when the electronic device 300 is moved to ears. As one type of motion sensor, an accelerometer sensor may detect magnitude of accelerations in various directions (generally, on three axes), may detect magnitude and a direction of gravity when static, and may be configured to recognize the attitude of the electronic device (for example, switching between landscape orientation and portrait orientation, a related game, and magnetometer attitude calibration), a function related to vibration recognition (such as a pedometer and a knock), and the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein again.

The display unit 306 is configured to display information inputted by the user or information provided to the user. The display unit 306 may include a display panel 3061, and the display panel 3061 may be configured in the form of a Liquid Crystal Display (LCD), an Organic Light-Emitting Diode (OLED), or the like.

The user input unit 307 may be configured to receive input digit or character information, and generate a keyboard signal input related to the user setting and function control of the electronic device. In some embodiments, the user input unit 307 may include a touch panel 3071 and another input device 3072. The touch panel 3071, also referred to as a touchscreen, may collect a touch operation performed by a user on or near the touch panel (such as an operation performed by a user on or near the touch panel 3071 by using any suitable object or attachment, such as a finger or a touch pen). The touch panel 3071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, then transmits the contact coordinates to the processor 310, and receives and executes a command transmitted by the processor 310. In addition, the touch panel 3071 may be implemented by using various types, such as a resistive type, a capacitive type, an infrared type, and a surface acoustic wave type. In addition to the touch panel 3071, the user input unit 307 may further include the another input device 3072. In some embodiments, the another input device 3072 may include, but is not limited to, a physical keyboard, a functional key (such as a volume control key or a switch key), a track ball, a mouse, and a joystick, and details are not described herein again.

Further, the touch panel 3071 may cover the display panel 3061. After detecting a touch operation on or near the touch panel 3071, the touch panel 3071 transfers the touch operation to the processor 310, so as to determine a type of the touch event. Then, the processor 310 provides corresponding visual output on the display panel 3061 according to the type of the touch event. Although, in FIG. 3, the touch panel 3071 and the display panel 3061 are used as two separate parts to implement input and output functions of the electronic device, in some embodiments, the touch panel 3071 and the display panel 3061 may be integrated to implement the input and output functions of the electronic device, and details are not described herein again.

The interface unit 308 is an interface for connection between an external device and the electronic device 300. For example, the external device may include a wired or wireless headphone port, an external power (or a battery charger) port, a wired or wireless data port, a memory card port, a port for connecting devices with an identification module, an audio Input/Output (I/O) port, a video I/O port, a headphone port, and the like. The interface unit 308 may be configured to receive input from the external device (for example, data information and power) and transmit the received input to one or more elements in the electronic device 300, or may be configured to transmit data between the electronic device 300 and the external device.

The memory 309 may be configured to store software programs and various pieces of data. The memory 309 may mainly include a program storage region and a data storage region. The program storage region may store an operating system, an application program required by at least one function (for example, a sound playback function and an image playback function), or the like. The data storage region may store data (for example, audio data and a phone book) created according to use of the mobile phone. In addition, the memory 309 may include a high-speed random access memory, and may further include a non-volatile memory, such as at least one magnetic disk storage device, a flash memory device, or other non-volatile solid state storage devices.

The processor 310 is a control center of the electronic device, and connects various parts of the entire electronic device by using various interfaces and lines. By running or executing a software program and/or a module stored in the memory 309, and invoking data stored in the memory 309, the processor performs various functions of the electronic device and processes data, thereby performing overall monitoring on the electronic device. The processor 310 may include one or more processing units. In some embodiments, the processor 310 may integrate an application processor and a modem processor. The application processor mainly processes an operating system, a user interface, an application program, and the like. The modem processor mainly processes wireless communication. It may be understood that the modem processor may either not be integrated into the processor 310.

The electronic device 300 may further include the power supply 311 (such as a battery) for supplying power to the components. In some embodiments, the power supply 311 may be logically connected to the processor 310 by using a power management system, thereby implementing functions such as charging, discharging, and power consumption management by using the power management system.

In addition, the electronic device 300 includes a number of functional modules that are not shown, and details are not described herein again.

For example, an embodiment of the present disclosure further provides an electronic device, including a processor 310, a memory 309, and a computer program stored on the memory 309 and executable by the processor 310. The computer program, when executed by the processor 310, implements various processes of the embodiments of the image processing method, and the same technical effect can be achieved. In order to avoid repetition, details are not described herein again.

An embodiment of the present disclosure further provides a computer-readable storage medium, storing a computer program. When executed by a processor, the computer program implements various processes of the embodiments of the image processing method, and the same technical effect can be achieved. In order to avoid repetition, details are not described herein again. The computer-readable storage medium is, for example, a Read-Only Memory (ROM), a Random Access Memory (RAM), a magnetic disk, or an optical disc.

It may be understood that these embodiments described in the present disclosure may be implemented by hardware, software, firmware, middleware, microcode, or a combination thereof. For hardware implementation, modules, units, sub-modules, sub-units, and the like may be implemented in one or more Application Specific Integrated Circuit (ASIC), Digital Signal Processor (DSP), DSP Device (DSPD), Programmable Logic Device (PLD), Field-Programmable Gate Array (FPGA), general purpose processors, controllers, microcontrollers, microprocessors, other electronic units for performing the functions described in this application, or combinations thereof.

It should be noted that, in this specification, the term "include", "comprise", or any other variant is intended to cover a non-exclusive inclusion, so that a process, a method, an article, or an apparatus including a series of elements not only includes those elements, but also includes other elements that are not listed explicitly, or may further include elements inherent in the process, the method, the article, or the apparatus. Without more limitations, elements defined by the sentence "including one" does not exclude that there are still other same elements in the process, the method, the article, or the apparatus.

According to the description of the above implementations, a person skilled in the art may clearly understand that the method according to the embodiment may be implemented by means of software and a necessary general hardware platform, and certainly, may also be implemented by hardware, but in many cases, the former manner is a better implementation. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc), and contains several instructions to enable a terminal (which may be a mobile phone, a computer, a server, an air conditioner, a network device, or the like) to perform the methods according to the embodiments of the present disclosure.

The embodiments of the present disclosure have been described above with reference to the accompanying drawings, but the present disclosure is not limited to the above specific embodiments. The above specific embodiments are merely illustrative but not restrictive. A person of ordinary skill in the art may make various variations under the enlightenment of the present disclosure without departing from the spirit of the present disclosure and the protection scope of the claims, and such variations shall all fall within the protection scope of the present disclosure.

What is claimed is:

1. An image processing method, performed by an electronic device, wherein the method comprises:
receiving a first input performed by a user;
identifying a first text region on a target image in response to the first input;
training a first font style model of a first text of the first text region on the target image using a text image of the first text;
receiving a second input performed by the user;
in response to the second input, obtaining a first input text, and applying the first font style model to obtain a second text matching a font style of the first text based on the first input text; and
replacing the first text with the second text on the target image,
wherein after replacing the first text with the second text on the target image, the method further comprises:
performing perspective transformation on the second text on the target image according to a mapping relationship between a layer on which the text image of the first text is located and a background layer in the target image.

2. The method according to claim 1, wherein training the first font style model of the first text comprises:
identifying a language category to which the first text belongs; and
training the first font style model using a corpus corresponding to the language category.

3. The method according to claim 1, wherein after the replacing the first text with the second text on the target image, the method further comprises:
generating a background image in a region corresponding to the second text on the target image according to a background style corresponding to the text image of the first text.

4. The method according to claim 3, wherein the generating a background image in a region corresponding to the second text on the target image according to a background style corresponding to the text image of the first text comprises one of the following:
filling the region corresponding to the second text with pixels on the target image according to pixel information of a region corresponding to the text image of the first text, to generate the background image; or
generating the background image in the region corresponding to the second text by using a generative adversarial networks model according to the pixel information of the region corresponding to the text image of the first text.

5. The method according to claim 1, wherein after the identifying a first text region on a target image in response to the first input, the method further comprises:
displaying preset stored font styles to be selected;
receiving a third input of a target font style in the font styles to be selected by the user;
training, in response to the third input, a second font style model corresponding to the target font style to obtain a third text matching the target font style using the first text; and
replacing the first text with the third text on the target image.

6. An electronic device, comprising:
a memory storing computer-readable instructions; and
a processor coupled to the memory and configured to execute the computer-readable instructions, wherein the computer-readable instructions, when executed by the processor, cause the processor to perform operations comprising:
receiving a first input performed by a user;
identifying a first text region on a target image in response to the first input;
training a first font style model of a first text of the first text region on the target image using a text image of the first text;
receiving a second input performed by the user;
in response to the second input, obtaining a first input text, and applying the first font style model to obtain a second text matching a font style of the first text based on the first input text; and
replacing the first text with the second text on the target image,
wherein after replacing the first text with the second text on the target image, the operations further comprise:
performing perspective transformation on the second text on the target image according to a mapping relationship between a layer on which the text image of the first text is located and a background layer in the target image.

7. The electronic device according to claim 6, wherein training the first font style model of the first text comprises:
identifying a language category to which the first text belongs; and
training the first font style model using a corpus corresponding to the language category.

8. The electronic device according to claim 6, wherein after the replacing the first text with the second text on the target image, the operations further comprise:
generating a background image in a region corresponding to the second text on the target image according to a background style corresponding to the text image of the first text.

9. The electronic device according to claim 8, wherein the generating a background image in a region corresponding to the second text on the target image according to a background style corresponding to the text image of the first text comprises one of the following:
filling the region corresponding to the second text with pixels on the target image according to pixel information of a region corresponding to the text image of the first text, to generate the background image; or
generating the background image in the region corresponding to the second text by using a generative adversarial networks model according to the pixel information of the region corresponding to the text image of the first text.

10. The electronic device according to claim 6, wherein after the identifying a first text region on a target image in response to the first input, the operations further comprise:
displaying preset stored font styles to be selected;
receiving a third input of a target font style in the font styles to be selected by the user;
training, in response to the third input, a second font style model corresponding to the target font style to obtain a third text matching the target font style using the first text; and replacing the first text with the third text on the target image.

11. A non-transitory computer-readable medium storing instructions that, when executed by a processor, cause the processor to perform operations comprising:
receiving a first input performed by a user;
identifying a first text region on a target image in response to the first input;
training a first font style model of a first text of the first text region on the target image using a text image of the first text;
receiving a second input performed by the user;
in response to the second input, obtaining a first input text, and applying the first font style model to obtain a second text matching a font style of the first text based on the first input text; and
replacing the first text with the second text on the target image,
wherein after replacing the first text with the second text on the target image, the operations further comprise:
performing perspective transformation on the second text on the target image according to a mapping relationship between a layer on which the text image of the first text is located and a background layer in the target image.

12. The non-transitory computer-readable medium according to claim 11, wherein training the first font style model of the first text comprises:
identifying a language category to which the first text belongs; and
training the first font style model using a corpus corresponding to the language category.

13. The non-transitory computer-readable medium according to claim 11, wherein after the replacing the first text with the second text on the target image, the operations further comprise:

generating a background image in a region corresponding to the second text on the target image according to a background style corresponding to the text image of the first text.

14. The non-transitory computer-readable medium according to claim 13, wherein the generating a background image in a region corresponding to the second text on the target image according to a background style corresponding to the text image of the first text comprises one of the following:
filling the region corresponding to the second text with pixels on the target image according to pixel information of a region corresponding to the text image of the first text, to generate the background image; or
generating the background image in the region corresponding to the second text by using a generative adversarial networks model according to the pixel information of the region corresponding to the text image of the first text.

15. The non-transitory computer-readable medium according to claim 11, wherein after the identifying a first text region on a target image in response to the first input, the operations further comprise:
displaying preset stored font styles to be selected;
receiving a third input of a target font style in the font styles to be selected by the user;
training, in response to the third input, a second font style model corresponding to the target font style to obtain a third text matching the target font style using the first text; and
replacing the first text with the third text on the target image.

* * * * *